(12) United States Patent
Lee et al.

(10) Patent No.: US 11,446,976 B2
(45) Date of Patent: Sep. 20, 2022

(54) VEHICLE AIR CONDITIONER

(71) Applicant: Hanon Systems, Daejeon (KR)

(72) Inventors: Se Min Lee, Daejeon (KR); Dae Bok Keon, Daejeon (KR); Yun Jin Kim, Daejeon (KR); Jae Chun You, Daejeon (KR); Yo Chan Min, Daejeon (KR); Tae Yong Park, Daejeon (KR); Sung Je Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 154 days.

(21) Appl. No.: 16/645,364

(22) PCT Filed: Dec. 7, 2018

(86) PCT No.: PCT/KR2018/015521
§ 371 (c)(1),
(2) Date: Mar. 6, 2020

(87) PCT Pub. No.: WO2019/117548
PCT Pub. Date: Jun. 20, 2019

(65) Prior Publication Data
US 2021/0031586 A1 Feb. 4, 2021

(30) Foreign Application Priority Data

Dec. 15, 2017 (KR) .................. 10-2017-0172958

(51) Int. Cl.
*B60H 1/00* (2006.01)
*B60H 1/26* (2006.01)

(52) U.S. Cl.
CPC ..... *B60H 1/00007* (2013.01); *B60H 1/00042* (2013.01); *B60H 1/00057* (2013.01);
(Continued)

(58) Field of Classification Search
CPC ............ B60H 1/00007; B60H 1/00021; B60H 1/00042; B60H 1/00057; B60H 1/00285;
(Continued)

(56) References Cited

U.S. PATENT DOCUMENTS 4,976,309 A * 12/1990 Åverin ............... B60H 1/00057
237/12.3 A
5,673,964 A * 10/1997 Roan .................. B60H 1/00842
296/70
(Continued)

FOREIGN PATENT DOCUMENTS

DE 10336593 A1 3/2005
EP 1738941 A1 * 1/2007 ......... B60H 1/00035
(Continued)

OTHER PUBLICATIONS

International Search Report issued in PCT/KR2018/015521 dated Mar. 6, 2019.

*Primary Examiner* — Jenna M Hopkins
(74) *Attorney, Agent, or Firm* — Norton Rose Fulbright US LLP; James R. Crawford

(57) ABSTRACT

A vehicle air conditioner, wherein an air conditioner of an integrated heat pump system enables the improvement of cold air and warm air mixing characteristics so as to decrease left-right temperature differences, enables the implementation of independent left-right air conditioning, and enables the sufficient securement of an interior space of the vehicle.

14 Claims, 15 Drawing Sheets

(52) U.S. Cl.
CPC ........... B60H 1/00285 (2013.01); B60H 1/26 (2013.01); *B60H 2001/0015* (2013.01); *B60H 2001/00135* (2013.01); *B60H 2001/00178* (2013.01); *B60H 2001/00192* (2013.01)

(58) Field of Classification Search
CPC ........... B60H 1/00564; B60H 1/00871; B60H 2001/00092; B60H 2001/00107; B60H 2001/00135; B60H 2001/0015; B60H 2001/00178; B60H 2001/00192
See application file for complete search history.

(56) References Cited

U.S. PATENT DOCUMENTS

| | | | | |
|---|---|---|---|---|
| 6,021,957 A * | 2/2000 | Takechi | ............. | B60H 1/00842 237/12.3 A |
| 6,148,904 A * | 11/2000 | Tsunooka | ........... | B60H 1/00064 165/204 |
| 6,244,335 B1 * | 6/2001 | Nakamura | ......... | B60H 1/00028 165/203 |
| 6,311,763 B1 * | 11/2001 | Uemura | ................. | B60H 1/247 62/244 |
| 6,368,207 B1 * | 4/2002 | McLaughlin | ........ | B60H 1/0005 454/261 |
| 6,640,571 B2 * | 11/2003 | Matsunaga | ........ | B60H 1/00028 62/244 |
| 6,644,559 B2 * | 11/2003 | Kondo | ............... | B60H 1/00064 237/12.3 B |
| 6,739,149 B2 * | 5/2004 | Kang | ................. | B60H 1/00064 62/244 |
| 6,874,575 B2 * | 4/2005 | Kim | ................... | B60H 1/00064 237/12.3 A |
| 6,971,440 B1 * | 12/2005 | Beck | ................. | B60H 1/00064 165/203 |
| 6,991,027 B2 * | 1/2006 | Ozeki | ................. | B60H 1/0005 165/203 |
| 7,275,586 B2 * | 10/2007 | Beck | ................. | B60H 1/00064 454/156 |
| 7,819,178 B2 * | 10/2010 | Sawamukai | ......... | B60H 1/0005 165/203 |
| 7,823,631 B2 * | 11/2010 | Tonnelier | ........... | B60H 1/00057 165/203 |
| 8,408,980 B2 * | 4/2013 | Nanaumi | ........... | B60H 1/00842 454/126 |
| 8,608,532 B2 * | 12/2013 | Kumar | ............... | B60H 1/00564 454/144 |
| 9,610,823 B2 * | 4/2017 | Jia | ..................... | B60H 1/00064 |
| 9,919,576 B2 * | 3/2018 | Kim | ................... | B60H 1/00028 |
| 10,449,825 B2 * | 10/2019 | Woo | ................... | F24F 1/0323 |
| 10,479,161 B2 * | 11/2019 | Ryu | ........................ | B60H 1/32 |
| 10,518,603 B2 * | 12/2019 | Kim | ................... | B60H 1/00671 |
| 10,605,496 B2 * | 3/2020 | Navale | ................. | C01B 3/0005 |
| 10,611,207 B2 * | 4/2020 | Ryu | ................... | B60H 1/00535 |
| 10,654,334 B2 * | 5/2020 | Hensler | ............ | B60H 1/00842 |
| 10,675,938 B2 * | 6/2020 | Jung | ................. | B60H 1/00678 |
| 10,953,720 B2 * | 3/2021 | Ko | ................... | B60H 1/00692 |
| 11,052,726 B2 * | 7/2021 | Ryu | ................... | B60H 1/00871 |
| 2003/0037918 A1 * | 2/2003 | Lee | ..................... | B60H 1/00064 165/203 |
| 2005/0217295 A1 * | 10/2005 | Alberternst | ......... | B60H 1/0005 219/202 |
| 2007/0207719 A1 * | 9/2007 | Blasi | .................. | B60H 1/00057 454/121 |
| 2009/0117841 A1 * | 5/2009 | Goto | .................. | B60H 1/00064 454/127 |
| 2010/0043470 A1 * | 2/2010 | Kang | ................. | B60H 1/00064 62/239 |
| 2013/0283840 A1 * | 10/2013 | Kakizaki | ............ | B60H 1/00064 62/276 |
| 2016/0236535 A1 * | 8/2016 | Kuwayama | ........ | B60H 1/00678 |
| 2016/0303941 A1 * | 10/2016 | Kinmartin | .......... | B60H 1/00064 |
| 2017/0274731 A1 * | 9/2017 | Klinkhammer | .... | B60H 1/00471 |
| 2018/0093545 A1 * | 4/2018 | Park | .................. | B60H 1/00057 |
| 2018/0361824 A1 * | 12/2018 | Ryu | ................... | B60H 1/00035 |
| 2020/0215873 A1 * | 7/2020 | Suzuki | ............... | B60H 1/00871 |
| 2021/0031586 A1 * | 2/2021 | Lee | ................... | B60H 1/00285 |
| 2021/0197647 A1 * | 7/2021 | Lee | ................... | B60H 1/00564 |

FOREIGN PATENT DOCUMENTS

| | | | | |
|---|---|---|---|---|
| EP | 1738941 A1 * | 1/2007 | ......... | B60H 1/00035 |
| EP | 1905621 A1 * | 4/2008 | ......... | B60H 1/00035 |
| EP | 2106941 A1 * | 10/2009 | ......... | B60H 1/00064 |
| JP | S61188214 A | 8/1986 | | |
| JP | 10329525 A * | 12/1998 | | |
| JP | 11208245 A * | 8/1999 | ......... | B60H 1/00064 |
| JP | 2004-182157 A | 7/2004 | | |
| JP | 2004-237880 A | 8/2004 | | |
| JP | 2007168619 A | 7/2007 | | |
| KR | 10-2016-0121730 A | 10/2016 | | |
| KR | 10-2016-0129167 A | 11/2016 | | |
| KR | 10-2017-0015755 A | 2/2017 | | |
| KR | 20170086724 A | 7/2017 | | |
| WO | WO-2007055045 A1 * | 5/2007 | ......... | B60H 1/00057 |

* cited by examiner

PRIOR ART

VEHICLE AIR CONDITIONER

This application is a 371 of International Patent Application No. PCT/KR2018/015521 filed on Dec. 7, 2018, which claims priority from Korean Patent Application No. 10-2017-0172958 filed on Dec. 15, 2017, each of which is incorporated herein by reference in its entirety.

TECHNICAL FIELD

The present invention relates to an air conditioner for a vehicle, and more particularly, to an air conditioner for a vehicle, which includes an evaporator and a condenser respectively mounted in a first air passageway and a second air passageway inside an air-conditioning case in order to perform cooling and heating in an integrated type.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Such an air conditioner includes: a compressor for compressing and discharging refrigerant; a condenser for condensing the refrigerant of high pressure discharged from the compressor; an expansion valve for throttling the refrigerant condensed and liquefied in the condenser; and an evaporator for exchanging heat between the liquefied refrigerant of low pressure throttled by the expansion valve and air blown to the interior of the vehicle and evaporating the refrigerant to cool the air discharged to the interior of the vehicle due to heat absorption by evaporative latent heat, and a cooling cycle of the air conditioner is configured such that the compressor, the condenser, the expansion valve and the evaporator are connected with each other via refrigeration pipes.

Recently, heat pump systems which perform heating and cooling only using the cooling cycle have been developed. Especially, most of eco-friendly electric vehicles, such as electric vehicles and fuel cell vehicles, adopt a heat pump system capable of heating and cooling the interior of the vehicle without engine coolant since not using engine coolant as a heating heat source.

FIG. 1 is a sectional view showing a conventional air conditioner for a vehicle, and FIG. 2 is a plan view showing the conventional air conditioner for a vehicle. As shown in FIGS. 1 and 2, the air conditioner for a vehicle of a heat pump system includes an air-conditioning module 1 for generating cold air and warm air; and a distribution duct 2 for distributing the cold air and the warm air generated from the air-conditioning module 1 to the interior of the vehicle.

The air-conditioning module 1 includes an air-conditioning case 3 of which the inside is divided into a cold air passageway 3a of a lower side and a warm air passageway 3b of an upper side. A cooling heat exchanger 4 and a cold air adjusting door 5 are disposed in the cold air passageway 3a, and a heating heat exchanger 6 and a warm air adjusting door 7 are disposed in the warm air passageway 3b.

The distribution duct 2 includes an interior passageway 2a communicating with the cold and warm air passageways 3a and 3b of the air-conditioning module 1, and a plurality of discharge vents 2b branching from the internal passageway 2a. The distribution duct 2 discharges the cold air and the warm air blown from the cold and warm air passageways 3a and 3b of the air-conditioning module 1 to various parts of the interior of the vehicle in order to cool and heat the interior of the vehicle. An electric heater 2c acting as an auxiliary heat source in a heating mode may be disposed inside the distribution duct 2.

The air-conditioning module 1 is arranged at an engine room, which is located outside the interior on the basis of a dash panel 10, and the distribution duct 2 is arranged inside the vehicle. Moreover, an indoor air inflow duct for guiding indoor air to the inside of the air-conditioning module 1 is mounted inside the vehicle.

In a cooling mode, the indoor air and the outdoor air blown from a first blower 8 to the cold air passageway 3a are sent to the cooling heat exchanger 4 to be cooled, and the cooled air is blown toward the distribution duct 2 by adjustment of the cold air adjusting door 5. In this instance, the warm air of the warm air passageway 3b heated by the heating heat exchanger 6 is discharged to the outside through a warm air discharge hole 7a by control of the warm air adjusting door 7.

In the heating mode, the indoor air and the outdoor air blown from the second blower 9 to the warm air passageway 3b is heated by the heating heat exchanger 6, and the heated air is blown toward the distribution duct 2 by adjustment of the warm air adjusting door 7. In this instance, the cold air of the cold air passageway 3a cooled by the cooling heat exchanger 4 is discharged to the outside through a cold air discharge hole 5a by control of the cold air adjusting door 5.

Furthermore, in the heating mode, if it is necessary to dehumidify the interior of the vehicle, the cold air of the cold air passageway 3a bypasses toward the warm air passageway 3b through a bypass passageway 3c and a bypass door 3d, in order to supply cold air to the interior of the vehicle to dehumidify the interior of the vehicle.

The conventional integrated type air conditioner has a disadvantage in that cannot smoothly mix warm air and cold air in a mixing zone where the warm air and the cold air meet and are mixed together and it causes a temperature difference between the right side and the left side.

In addition, the conventional integrated type air conditioner cannot realize independent right and left air-conditioning to independently perform air-conditioning to the left side and the right slide, namely, the driver's seat and the passenger's seat, in a width direction of the vehicle by the nature of a flow path.

Additionally, the conventional integrated type air conditioner has several disadvantages in that the structure of the flow path is complicated, manufacturing costs are expensive due to lots of components, a binding force is limited, and a space for passenger gets narrow since some of the components are arranged in the interior of the vehicle.

DISCLOSURE

Technical Problem

Accordingly, the present invention has been made in view of the above-mentioned problems occurring in the prior art, and it is an object of the present invention to provide an air conditioner of an integrated type heat pump system which can improve mixability of cold air and warm air so as to decrease a temperature difference between the right side and the left side, realize independent left-right air conditioning, and secure a sufficient interior space.

Technical Solution

To accomplish the above object, according to the present invention, there is provided an air conditioner for a vehicle including: a first air passageway and a second air passageway, a heating heat exchanger disposed in one among the first air passageway and the second air passageway and a cooling heat exchanger disposed in the other one among the first air passageway and the second air passageway, wherein the air conditioner is divided into a zone where some of the air passing in the first air passageway and some of the air passing in the second air passageway are mixed together and a zone where the rest of the air passing in the first air passageway and the rest of the air passing in the second air passageway are mixed together.

Advantageous Effects

As described above, the air conditioner for a vehicle according to the present invention can improve mixability of warm air and cold air to enhance a temperature difference between the right side and the left side, adjust an air volume and temperature at the right side and the left side as a passenger wants through manipulation of a controller or automatic control, and provide constant air-conditioning without any change in air volume of the opposite side even though one among the right side and the left side is turned off.

MODE FOR INVENTION

Figure 1:
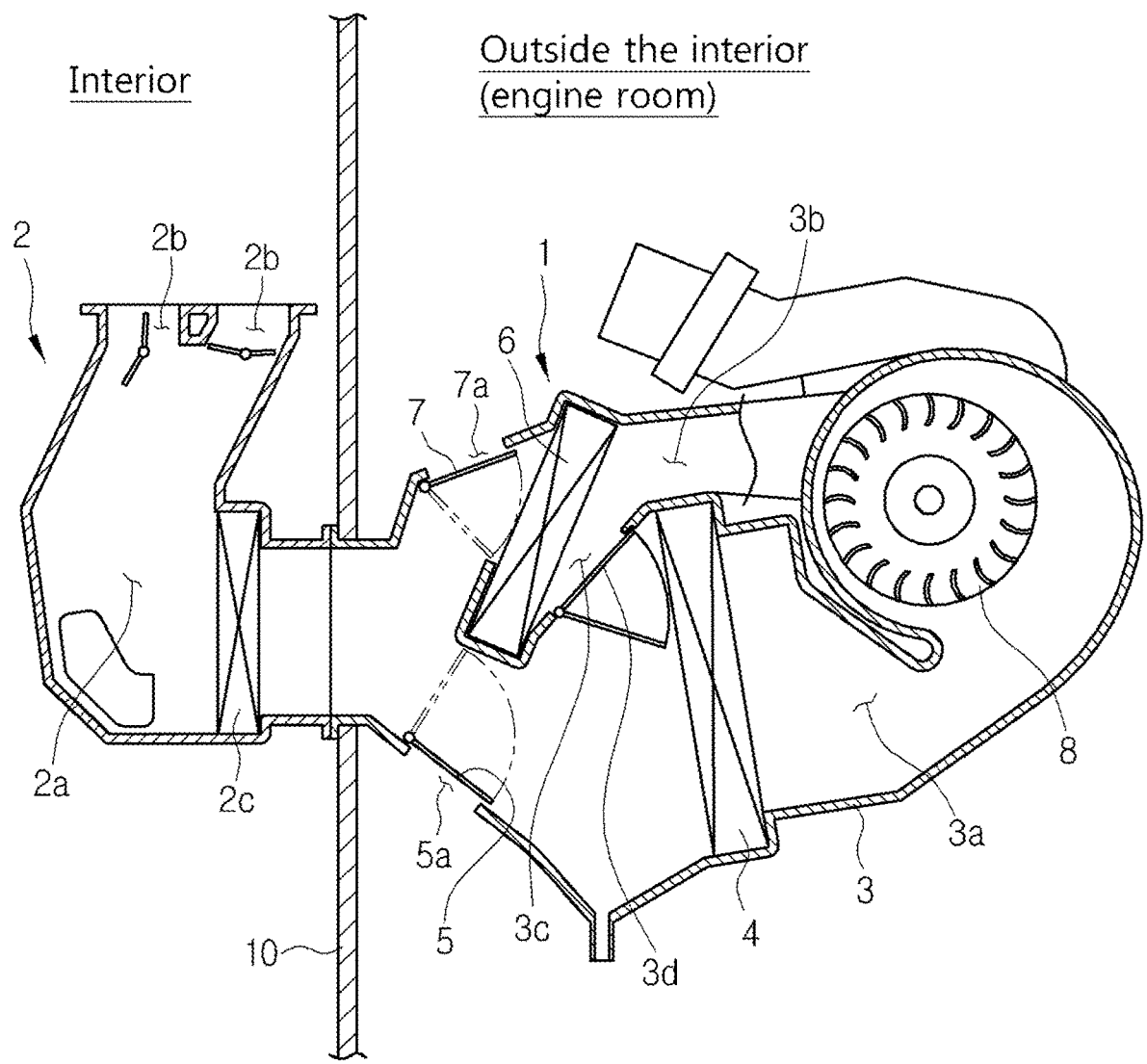
FIG. 1 is a sectional view showing a conventional air conditioner for a vehicle.
Figure 2:
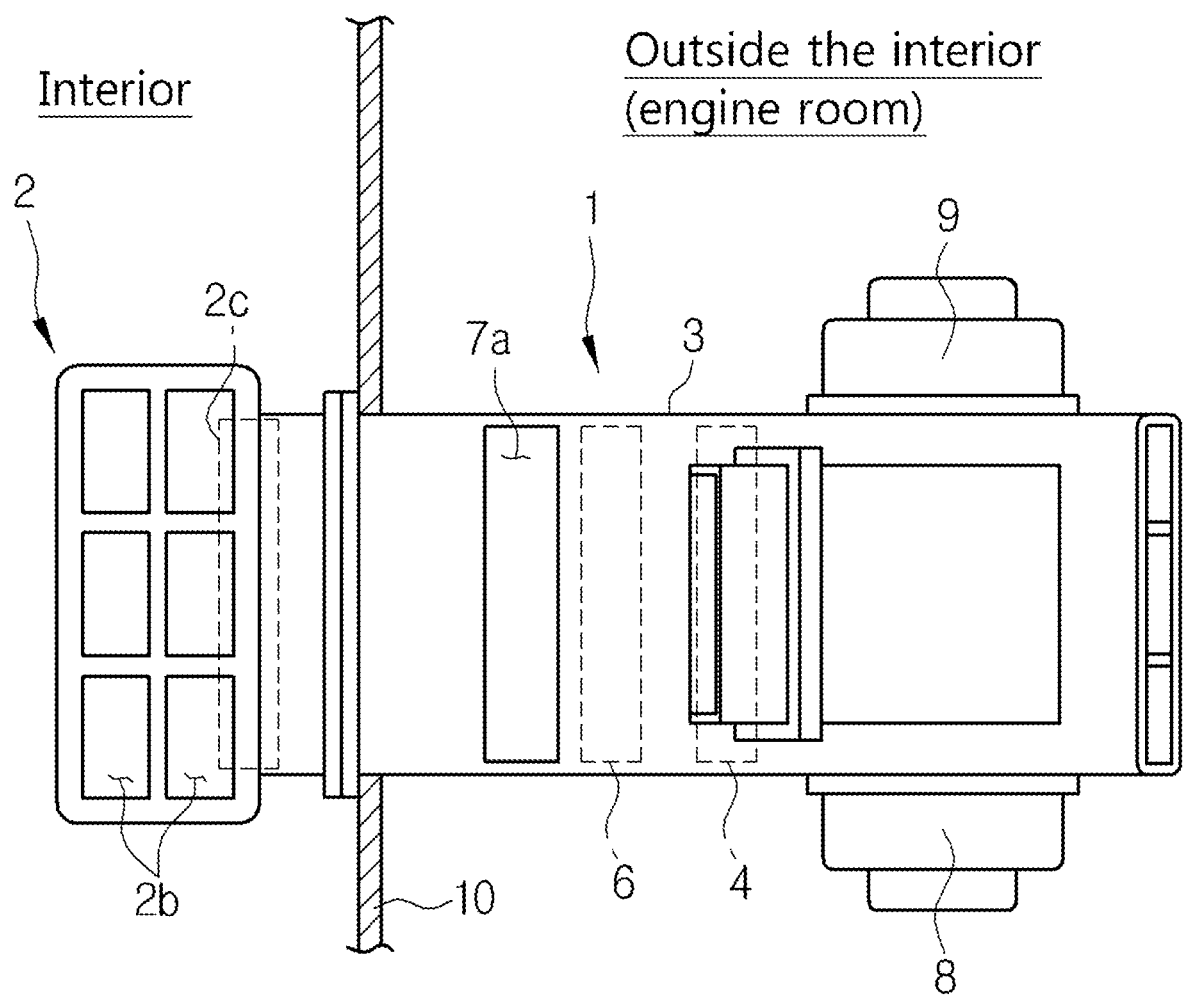
FIG. 2 is a plan view showing the conventional air conditioner for a vehicle.
Figure 3:
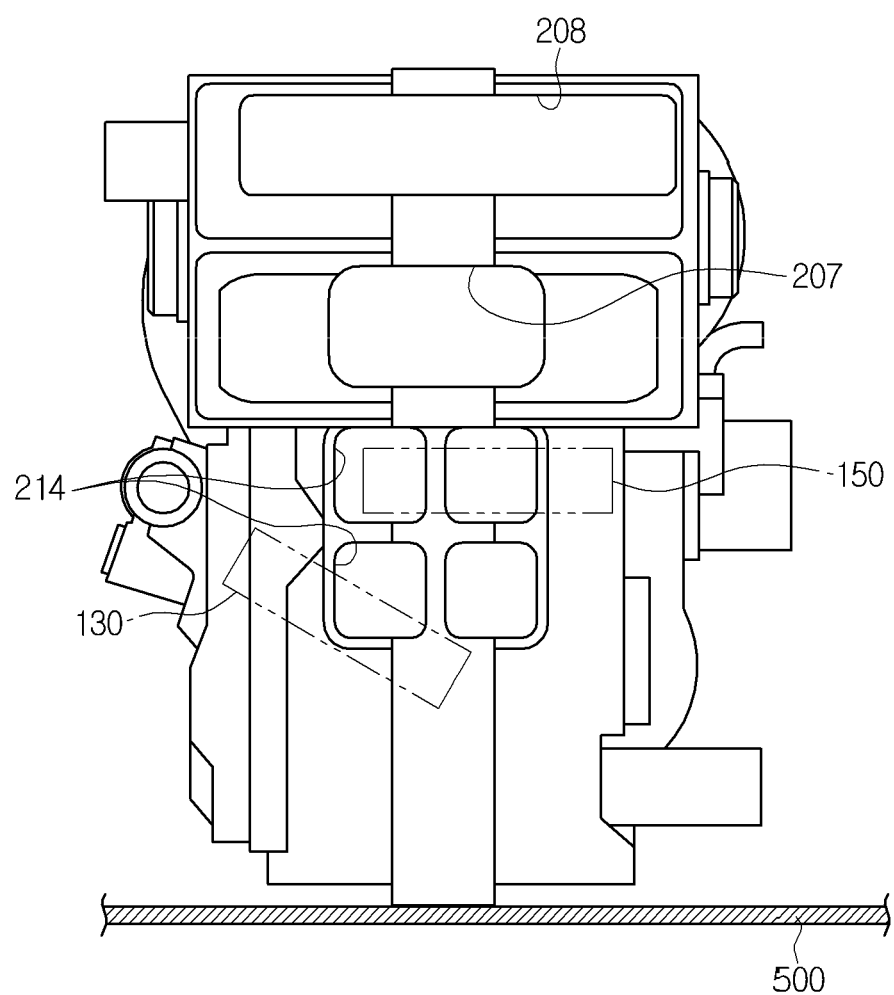
FIG. 3 is a plan view showing an air conditioner for a vehicle according to a preferred embodiment of the present invention.

Hereinafter, a technical structure of an air conditioner for a vehicle according to an embodiment of the present invention will be described in detail with reference to the accompanying drawings.

As shown in FIGS. 3 to 11, the air conditioner for a vehicle according to a preferred embodiment of the present invention has a heat pump system with an integrated air-conditioning type, and includes an air-conditioning module 100 and a mixing-duct module 200.

The air-conditioning module 100 includes at least one among a heating heat exchanger and a cooling heat exchanger, which exchange heat with air. The mixing-duct module 200 includes an intake module and a distributor module which are formed integrally. The intake module introduces at least one of indoor air or outdoor air to the air-conditioning module 100. The distributor module discharges air blown from the air-conditioning module 100 to parts of the interior of the vehicle.

The air-conditioning module 100 includes an air-conditioning case 110, an evaporator 150 which is the cooling heat exchanger, a condenser 130 which is the heating heat exchanger, a compressor, an expansion valve, and a blower unit.

The air-conditioning case 110 includes a first air passageway 101 which is a cooling passageway and a second air passageway 102 which is a heating passageway, and the first air passageway 101 and the second air passageway 102 are partitioned from each other inside the air-conditioning case 110 by a partition wall 119. Indoor air or outdoor air is selectively introduced through the first air passageway 101, and indoor air or outdoor air is selectively introduced also through the second air passageway 102.

The evaporator 150 which is the cooling heat exchanger is disposed in the first air passageway 101. The evaporator 150 exchanges heat between liquid-phase refrigerant of low pressure discharged from the expansion valve, which will be described later, and the inside air of the air-conditioning case 110 so as to cool air due to heat absorption by evaporative latent heat of refrigerant.

The condenser 130 which is the heating heat exchanger is disposed in the second air passageway 102. The condenser 130 exchanges heat between gas-phase refrigerant of high-temperature and high-pressure discharged from the compressor, which will be described later. In this process, the refrigerant is condensed and air is heated.

The compressor is an electro-compressor actuated by electric energy. The compressor inhales and compresses gas-phase refrigerant of low-temperature and low-pressure passing through the evaporator 150, and then, discharges the refrigerant in a gas phase of high-temperature and high-pressure to the condenser 130.

The expansion valve rapidly expands the liquid-phase refrigerant discharged from the condenser 130 by a throttling action, and sends the refrigerant in a wet-saturated state of low-temperature and low-pressure to the evaporator 150. The expansion valve may adopt one of an EXV, a TXV, and an orifice structure. The compressor, the condenser 130, the expansion valve and the evaporator 150 are disposed in a refrigerant line 150 in order.

The air conditioner for a vehicle is to selectively supply indoor air and outdoor air to the evaporator 150 and the condenser 130. In a cooling mode, the indoor air exchanges heat with the evaporator 150 and is supplied to the interior of the vehicle, and the indoor air exchanges heat with the condenser 130 and is discharged to the outside the interior. In a heating mode, the indoor air exchanges heat with the condenser 130 and is supplied to the interior of the vehicle, and the outdoor air exchanges heat with the evaporator 150 and is discharged to the outside the interior. However, a flow of air by each air-conditioning mode is not limited to this embodiment of the present invention.

The blower unit inhales indoor air or outdoor air into the first air passageway 101 and the second air passageway 102. The blower unit includes a blower motor and a blower wheel combined with the blower motor to be rotated. The blower unit may have an inhalation type structure to inhale air into the air-conditioning case 110.

The mixing-duct module 200 includes an intake module and a distributor module which are formed integrally. The distributor module discharges the air blown from at least one among the first air passageway 101 and the second air passageway 102 of the air-conditioning module 100 to parts of the interior of the vehicle.

The air-conditioning module 100, the intake module and the distributor module are all arranged outside on the basis of a dash panel 500 of the vehicle. Therefore, the air conditioner for a vehicle according to the present invention can increase a space for passengers by securing an interior space of the vehicle.

The mixing-duct module 200 includes a mixing-duct case 210. The mixing-duct case 210 has an intake case of the intake unit for inhaling air and a distribution case of the distributor module for mixing heated air-conditioned air and discharging the mixed air to the interior of the vehicle, and the intake case and the distribution case are combined with each other in a horizontal direction.

Figure 4:
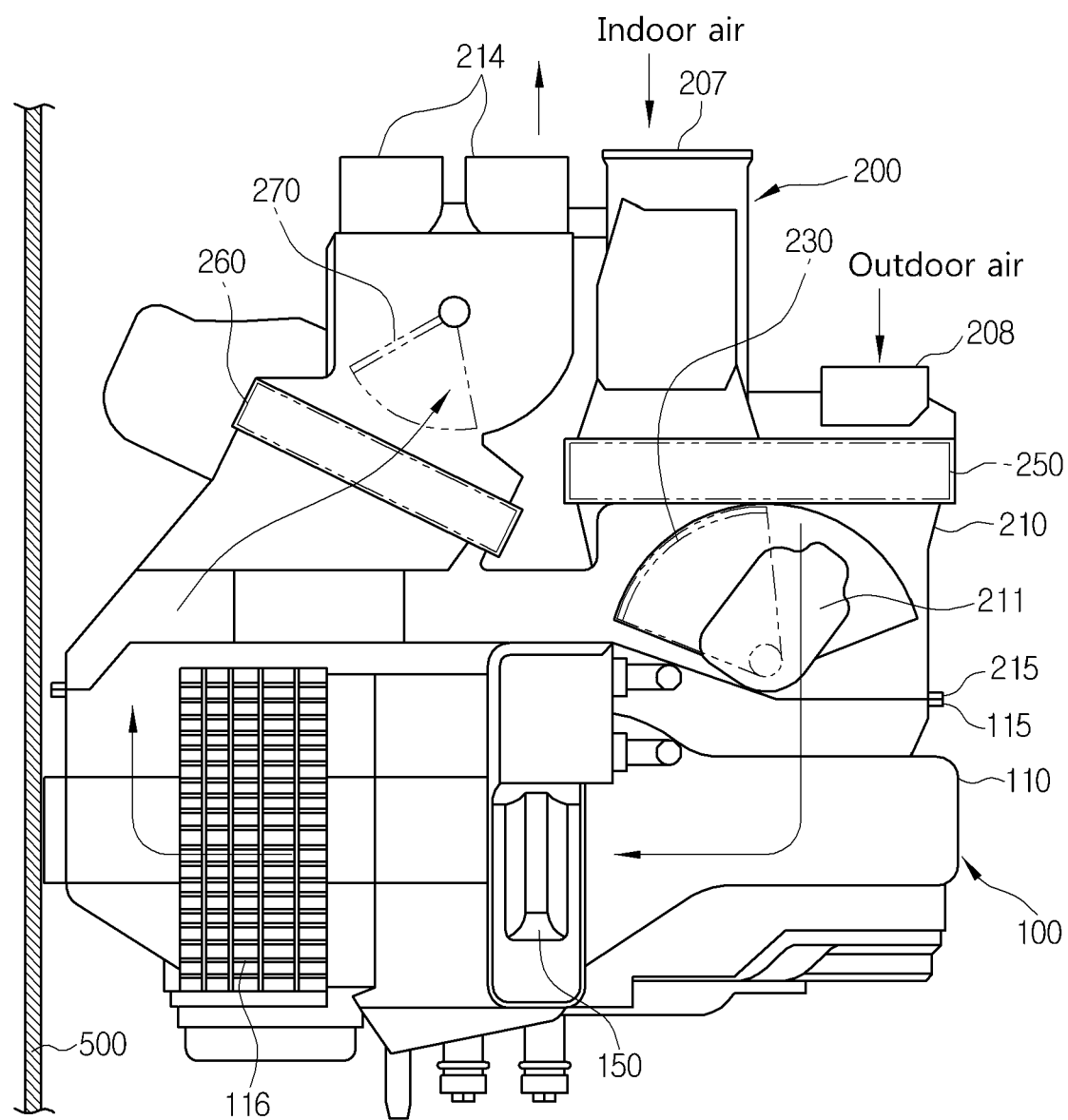
FIG. 4 is a side view showing the air conditioner for a vehicle according to the preferred embodiment of the present invention.
Figure 5:
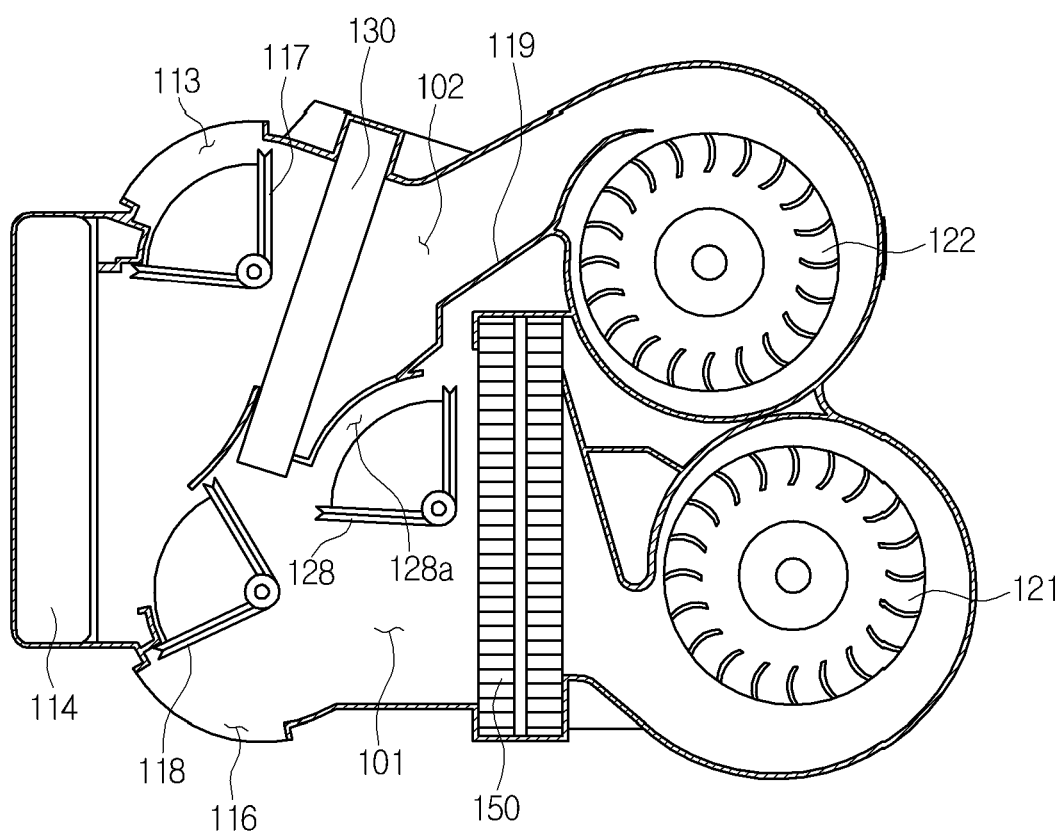
FIG. 5 is a cross-sectional view showing the air conditioner for a vehicle according to the preferred embodiment of the present invention.
Figure 6:
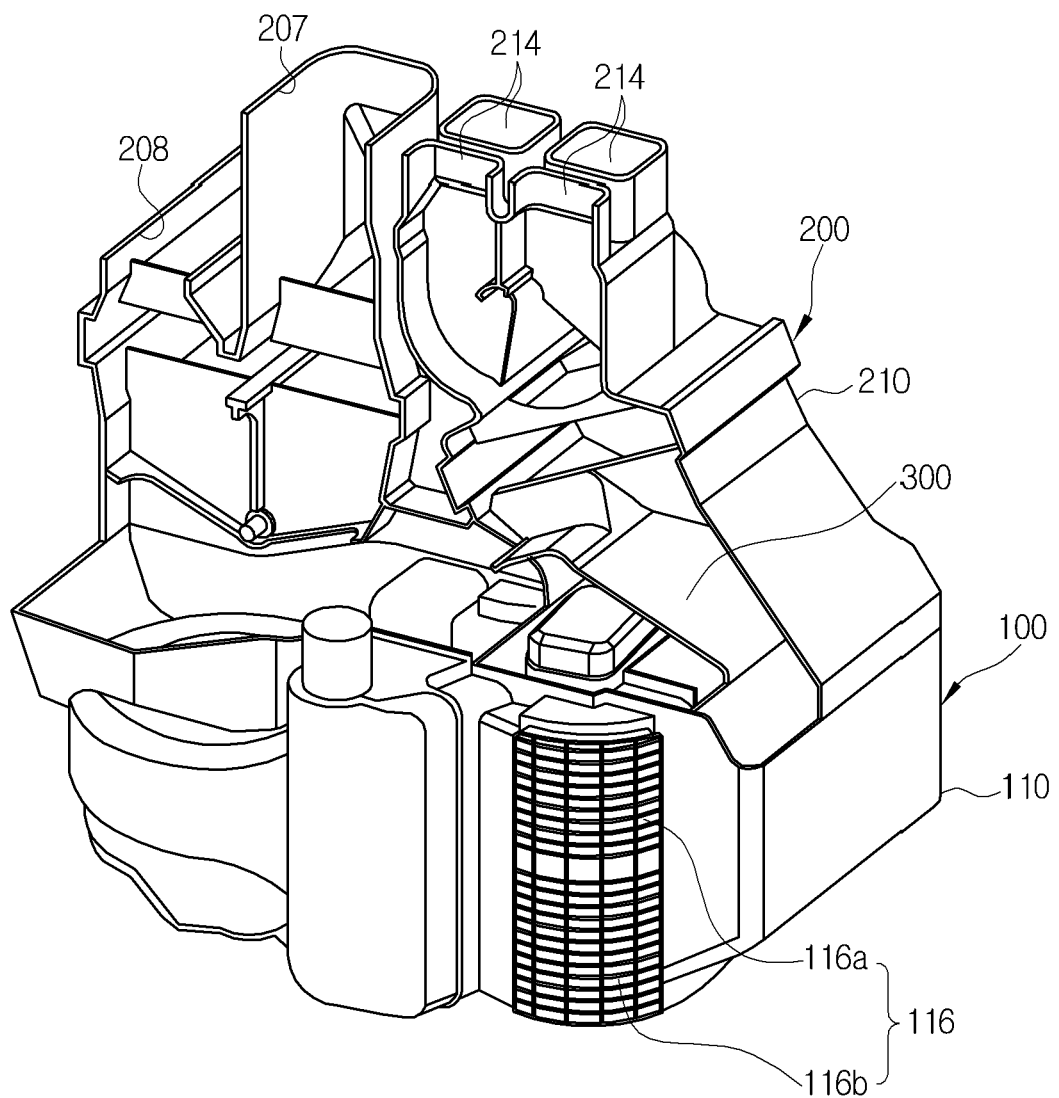
FIG. 6 is a perspective view, in partial section, of the air conditioner for a vehicle according to the preferred embodiment of the present invention.

That is, as shown in FIG. 4, the intake module and the distributor module are partitioned from each other in a back-and-forth direction of the vehicle, and then, are combined with each other integrally to form a single mixing-duct module 200. In this instance, the right side in FIG. 4 is the front side of the vehicle, and the left side is the rear side of the vehicle. The left side (rear side) based on the dash panel 500 is the interior space of the vehicle, and the right side is the outside the interior (engine room).

The air-conditioning case 110 and the mixing-duct case 210 are detachably coupled with each other through a means, such as a screw. The air-conditioning case 210 has a coupling portion 115, and the mixing-duct case 210 has another coupling portion 215 corresponding to the coupling portion 115, and the two coupling portions are coupled with each other through the screw. Preferably, the mixing-duct case 210 and the air-conditioning case 110 are coupled with each other in a vertical direction. More preferably, the mixing-duct case 210 is arranged on the air-conditioning case 110.

The mixing-duct case 210 includes an indoor air inlet 207, an outdoor air inlet 208, and a plurality of air outflow holes 214. The indoor air inlet 207 is to introduce indoor air into the air-conditioning case, and is connected to an indoor air inflow duct to inhale indoor air. The outdoor air inlet 208 is to introduce outdoor air into the air-conditioning case, and is connected to an outdoor air inflow duct to inhale outdoor air.

The indoor air inlet 207, the outdoor air inlet 208, and the air outflow holes 214 are all formed in the same direction. That is, the indoor air inlet 207, the outdoor air inlet 208, and the air outflow holes 214 are all opened upwardly. The air outflow hole 214 includes a roof vent for discharging air-conditioned air toward the ceiling, in the interior of the vehicle, and a floor vent for discharging the air-conditioned air toward the floor, in the interior of the vehicle. The mixing-duct module 200 may further include a PTC heater 260, which is an auxiliary heating heat source, at the distributor module. Moreover, a mode door 270 for selectively discharging air to the roof vent or the floor vent may be disposed at the front ends of the air outflow holes 214.

The mixing-duct module 200 includes a single air filter 250. The air filter 250 filters air introduced into the indoor air inlet 207 and the outdoor air inlet 208. The air-conditioning module 100 includes a first blower unit 121 and a second blower unit 122 respectively disposed in the first air passageway 101 and the second air passageway 102. The first blower unit 121 and the second blower unit 122 are arranged parallel in a horizontal direction. Additionally, the indoor air inlet 207 and the outdoor air inlet 208 of the mixing-duct case 210 are located above the second blower unit 122 to correspond to each other.

An indoor and outdoor air converting door 230 is disposed between the air filter 250 and the blower unit. The indoor and outdoor air converting door 230 is rotatably mounted on the mixing-duct case 210 and controls the degree of opening of the indoor air inlet 207 and the outdoor air inlet 208 so as to selectively introduce indoor air and outdoor air toward the air-conditioning module 100. The indoor and outdoor air converting door 230 is rotated by an actuator. The mixing-duct case 210 may include an actuator cover 211 formed integrally with the mixing-duct case to cover the actuator. Moreover, the mixing-duct case 210 includes a cover 271 formed integrally with the mixing-duct case to cover the actuator actuating the mode door 270.

The air conditioner for a vehicle has a generally "⊔" or "U" shaped passage through the structure that the air-conditioning module 100 and the mixing-duct module 200 are combined with each other vertically and the structure that the indoor air inlet 207 and the outdoor air inlet 208 are arranged at the upper part, a pair of the blower units 121 and 122 are arranged collaterally below the indoor air inlet 207 and the outdoor air inlet 208, the evaporator 150 and the condenser 130 are arranged in the horizontal direction relative to the blower units 121 and 122 and the plurality of air outflow holes 214 are located above the air-conditioning module 100.

That is, the air moves downwardly through the indoor air inlet 207 or the outdoor air inlet 208 of the mixing-duct module 200, exchanges heat with at least one of the heating heat exchanger and the cooling heat exchanger while moving in the horizontal direction in the air-conditioning module 100, and then, moves upwardly through the air outflow holes 214 of the mixing-duct module 200 so as to form an air flow of the "⊔" or "U" shape.

The air-conditioning module 100 includes a cold air discharge hole 116 formed at the downstream side of the evaporator 150 in the first air passageway 101, and a warm air discharge hole 113 formed at the downstream side of the condenser 130 in the second air passageway 102. The cold air discharge hole 116 is formed at the left side of the air-conditioning case 110, and the warm air discharge hole 113 is formed at the right side of the air-conditioning case 110. Moreover, the air-conditioning case 110 includes a communication passageway 114 formed at the downstream side of the evaporator 150 of the first air passageway 101 and at the downstream side of the condenser 130 of the second air passageway 102 to communicate with the mixing-duct module 200.

A cold air mode door 118 is rotatably disposed at the downstream side of the evaporator 150 of the first air passageway 101, and a warm air mode door 117 is rotatably disposed at the downstream side of the condenser 130 of the second air passageway 102. The cold air mode door 118 adjusts an amount of air heading towards the communication passageway 114 and an amount of air heading towards the cold air discharge hole 116, and the warm air mode door 117 adjusts an amount of air heading towards the communication passageway 114 and an amount of air heading towards the warm air discharge hole 113.

Furthermore, the air-conditioning module 100 includes a bypass door 128 and a bypass passageway 128a. In the heating mode, if it is necessary to dehumidify the interior of the vehicle, the cold air of the first air passageway 101 bypasses toward the second air passageway 102 through the bypass door 128 and the bypass passageway 128a. Therefore, the cold air toward the first air passageway 101 is supplied to the interior of the vehicle to dehumidify the interior of the vehicle.

The air conditioner for a vehicle is configured in such a way that the air passing at least one among the evaporator 150 and the condenser 130 is independently discharged to different zones in the interior of the vehicle. That is, the air passing at least one among the evaporator 150 and the condenser 130 is discharged to the right and the left of the interior of the vehicle to perform right and left air-conditioning independently.

As described above, the cooling heat exchanger and the cold air discharge hole 116 are disposed in the first air passageway 101, and the heating heat exchanger and the warm air discharge hole 113 are disposed in the second air passageway 102. Moreover, the cold air discharge hole 116 and the warm air discharge hole 113 are formed at right and left sides of the case in the vehicle width direction. In the meantime, the first air passageway 101 and the second air passageway 102 are partitioned by the partition wall 119 in the right and left direction, and are divided into an upper passageway 103 and a lower passageway 104 by a separator 300.

The evaporator 150 and the condenser 130 are vertically divided into two by the separator 300. The cold air mode door 118 is disposed at the first air passageway 101 in order to adjust the degree of opening between a flow path heading towards the cold air discharge hole 116 and a flow path heading towards the interior of the vehicle. The warm air mode door 117 is disposed in the second air passageway 102 in order to adjust the degree of opening between a flow path heading towards the warm air discharge hole 113 and the flow path heading the interior of the vehicle.

The cold air discharge hole 116 includes an upper cold air discharge hole 116a and a lower cold air discharge hole 116b. The upper cold air discharge hole 113 is formed on the lower cold air discharge hole 116b. The warm air discharge hole 113 includes an upper warm air discharge hole 113a and a lower warm air discharge hole 113b. The upper warm air discharge hole 113a is formed on the lower warm air discharge hole 113b.

The cold air mode door 118 is configured in such a way that the upper cold air mode door 118a and the lower cold air mode door 118b are actuated independently. Furthermore, the warm air mode door 117 is configured in such a way that the upper warm air mode door 117a and the lower warm air mode door 117b are actuated independently. The upper cold air mode door 118a adjusts the degree of opening of the upper cold air discharge hole 116a, and the lower cold air mode door 118b adjusts the degree of opening of the lower cold air discharge hole 116b. Additionally, the upper warm air mode door 117a adjusts the degree of opening of the warm air discharge hole 113a, and the lower warm air mode door 117b adjusts the degree of opening of the lower warm air discharge hole 113b.

The air moving downwardly through the indoor air inlet 207 or the outdoor air inlet 208 of the mixing-duct module 200 exchanges heat with the evaporator 150 and the condenser 130 while moving in the horizontal direction in the air-conditioning module 100. The air flows into the two zones, namely the upper passageway 103 and the lower passageway 104, divided by the separator 300.

Figure 7:
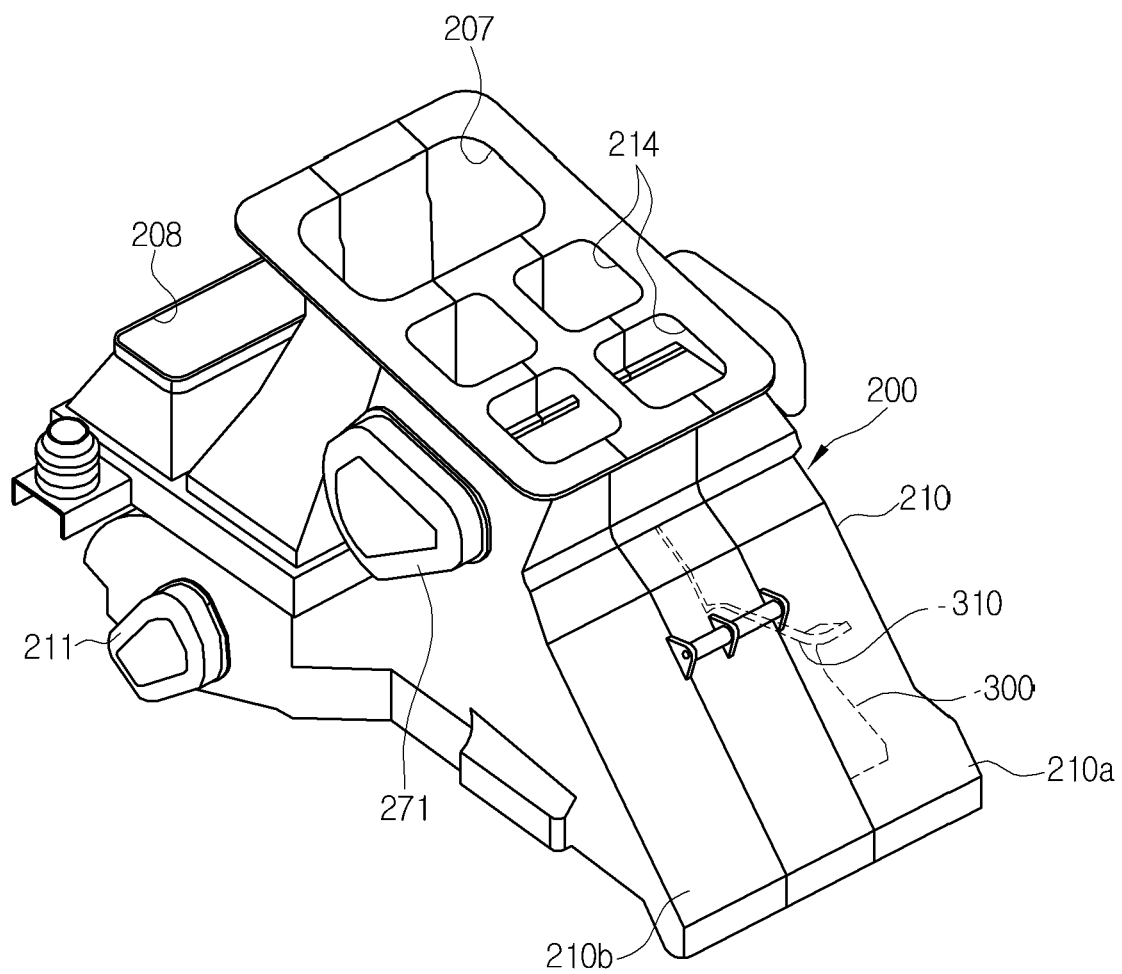
FIG. 7 is a perspective view showing a mixing-duct module of the air conditioner for a vehicle according to the preferred embodiment of the present invention.
Figure 8:
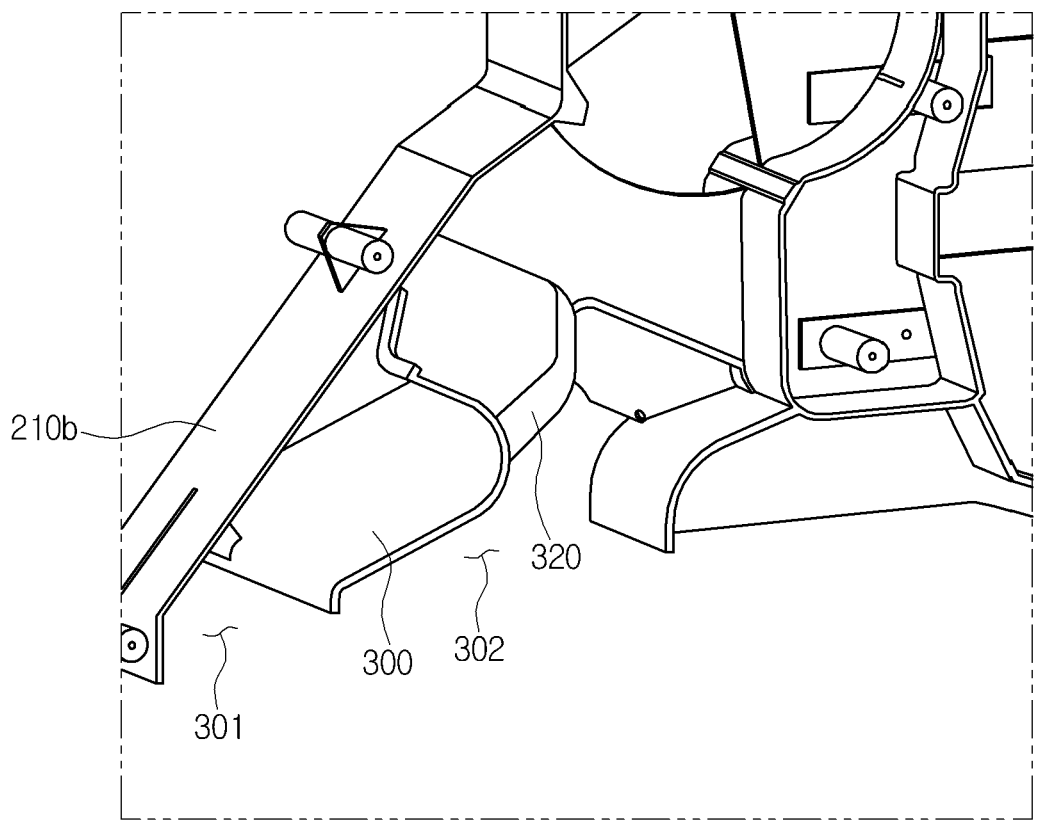
FIG. 8 is a perspective view showing the inside of a mixing-duct case showing a separator of the air conditioner for a vehicle according to the preferred embodiment of the present invention.
Figure 10:
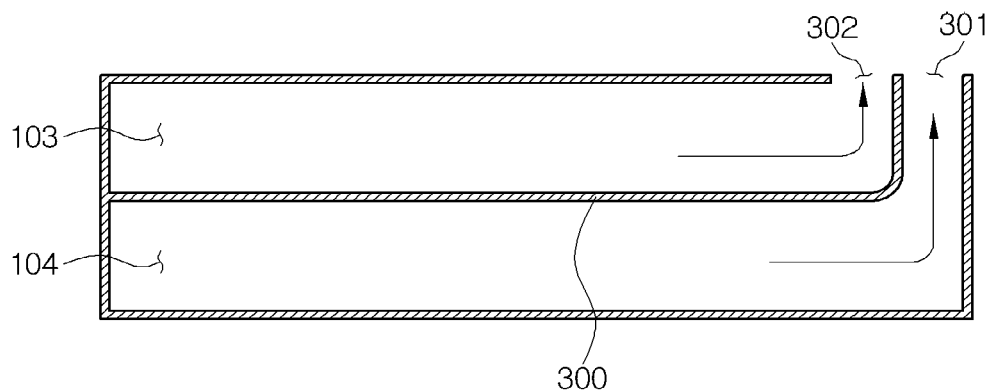
FIG. 10 is a side sectional view showing the separator of the air conditioner for a vehicle according to the preferred embodiment of the present invention.
Figure 11:
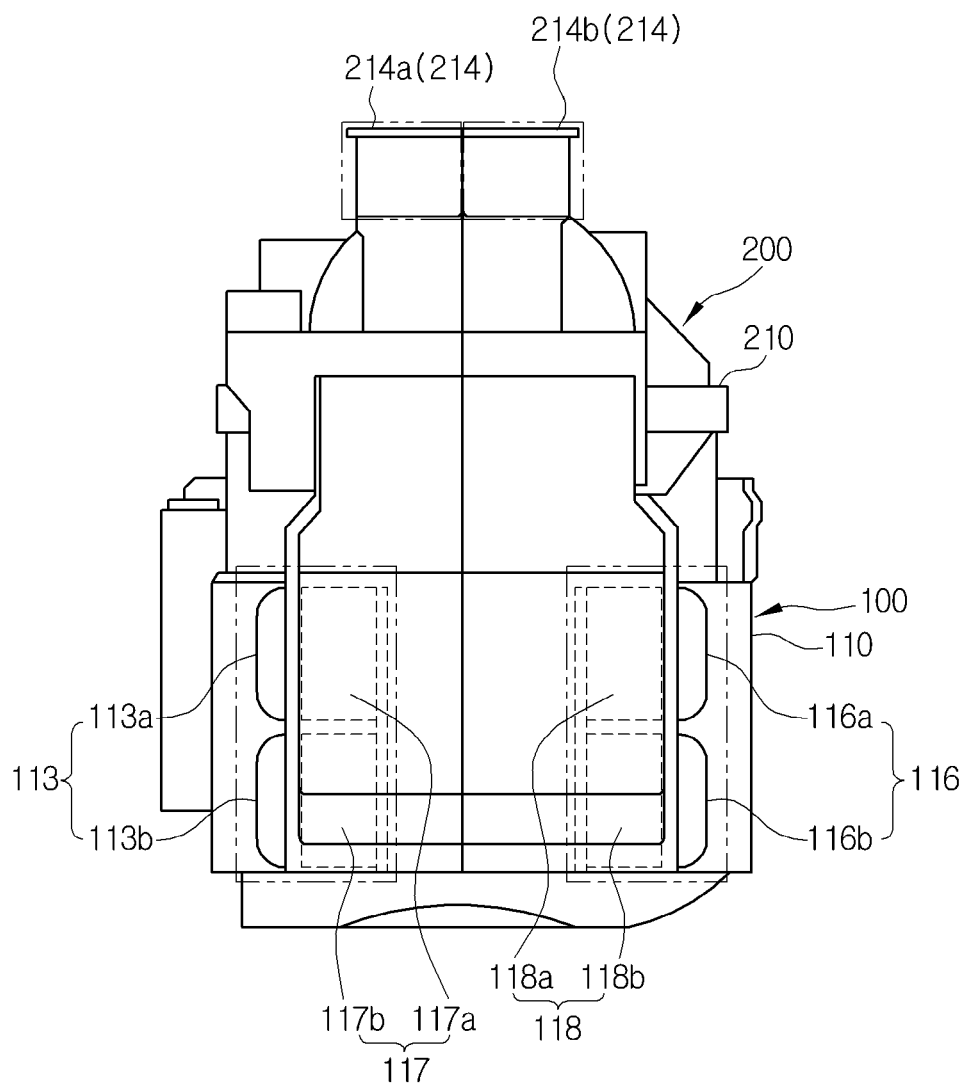
FIG. 11 is a front view showing the air conditioner for a vehicle according to the preferred embodiment of the present invention.

The communication passageway 114 is divided into a first communication passageway 301 and a second communication passageway 302 by the separator 300. That is, as shown in FIG. 10, the separator 300 extends from the air-conditioning case 110 of the air-conditioning module 100 in the horizontal direction and divides the upper passageway 103 and the lower passageway 104. Moreover, the separator 300 extends upwardly from the cold air mode door 118 and the warm air mode door 117, and divides the upper passageway 103 and the lower passageway 104 in the back-and-forth direction of the vehicle as shown in FIGS. 7 and 8.

The air flowing in the lower passageway 104 is guided upwards after passing the first communication passageway 301, and is discharged to one among the driver's seat and the passenger's seat. The air flowing in the upper passageway 103 is guided upwards after passing the second communication passageway 302, and is discharged to the other one among the driver's seat and the passenger's seat.

That is, the air flowing in the lower passageway 104 is discharged to the outside through the lower cold air discharge hole 116b or the lower warm air discharge hole 113b by control of the lower cold air mode door 118b or the lower warm air mode door 117b, or is guided upwards after passing the first communication passageway 301 and is discharged to one among the driver's seat and the passenger's seat.

In addition, the air flowing in the upper passageway 103 is discharged to the outside through the upper cold air discharge hole 116a or the upper warm air discharge hole 113a by control of the upper cold air mode door 118a or the upper warm air mode door 117a, or is guided upwards after passing the second communication passageway 302 and is discharged to the other one among the driver's seat and the passenger's seat.

The air conditioner for a vehicle includes a control unit. The control unit controls operations of various doors, the blower unit, and others of the air conditioner including the cold air mode door 118 and the warm air mode door 117. If air discharge toward the driver's seat or the passenger's seat is off, the control unit controls to discharge the air of the off-state side to the outside. Finally, an air volume of an on-state side remains constant independently relative to the air volume of the off-state side.

The air flowing in the first air passageway 101 and the second air passageway 102 of the upper passageway 103 is guided to be discharged to one among the driver's seat and the passenger's seat. Moreover, the air flowing in the first air passageway 101 and the second air passageway 102 of the lower passageway 104 is guided to be discharged to the other one among the driver's seat and the passenger's seat.

The air flow of the first air passageway 101 and the second air passageway 102 passing the evaporator 150 and the condenser 130 is formed in the horizontal direction, and the air flow toward the interior of the vehicle from the downstream side of the cold air mode door 118 and the warm air mode door 117 is formed in the upward direction. The first air passageway 101 and the second air passageway 102 is configured in such a way that cold air and warm air are mixed together during the air flowing process that the air flows upwardly from the downstream side of the cold air mode door 118 and the warm air mode door 117. The upper passageway 103 and the lower passageway 104 are divided in the back-and-forth direction of the vehicle by the separator 300 at the downstream side of the cold air mode door 118 and the warm air mode door 117.

Referring to FIGS. 7 and 8, the mixing-duct case 210 is formed by a right mixing-duct case 210a and a left mixing-duct case 210b combined with each other in the right-and-left direction. The separator 300 formed on the right mixing-duct case 210a has a first inclined part 310, and the separator 300 formed on the left mixing-duct case 210b has a second inclined part 320.

Figure 9:
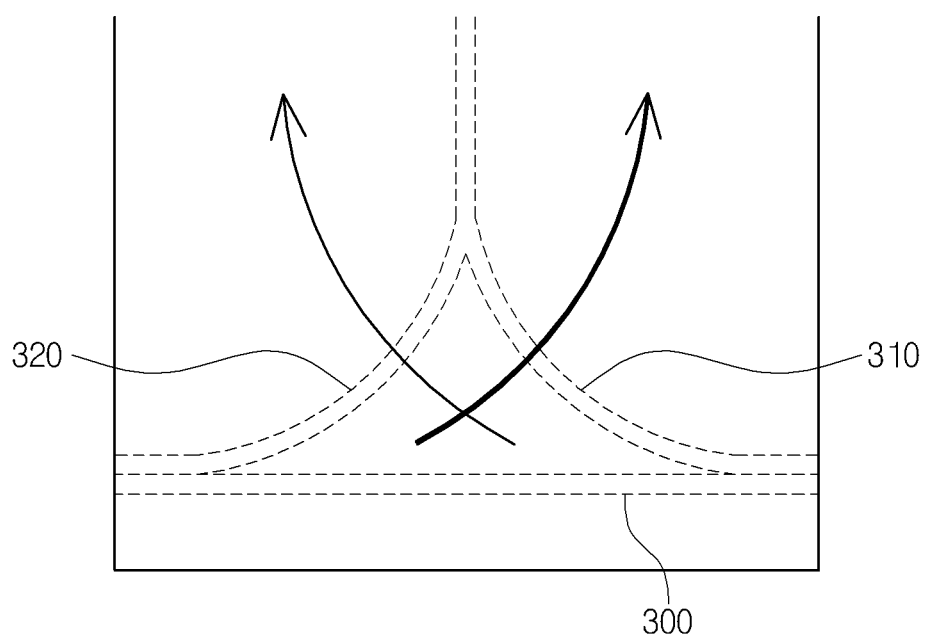
FIG. 9 is a front view showing the separator of the air conditioner for a vehicle according to the preferred embodiment of the present invention.

Referring to FIG. 9, the first inclined part 310 guides the cold air, the warm air, or mixed air of the warm air and the cold air, which passes the first communication passageway 301 after passing the lower passageway 104, to the left, and discharges the air through the air outflow hole 214 of the left side (driver's seat). The second inclined part 320 guides the cold air, the warm air, or mixed air of the warm air and the cold air, which passes the second communication passageway 302 after passing the upper passageway 103, to the right, and discharges the air through the air outflow hole 214 of the right side (passenger's seat).

The air conditioner for a vehicle is divided into a zone where some of the air passing in the first air passageway 101 and some of the air passing in the second air passageway 102 are mixed together and a zone where the rest of the air passing in the first air passageway 101 and the rest of the air passing in the second air passageway 102 are mixed together.

That is, the first air passageway 101 and the second air passageway 102 are respectively divided into the upper passageway 103 and the lower passageway 104 by the separator 300. In more detail, the separator 300 has a twist structure to mix the cold air and the warm air together. The separator 300 includes the first inclined part 310 and the second inclined part 320. The first inclined part 310 guides the air of the lower passageway 104 to one of the right and left sides, which are the width direction of the vehicle, and the second inclined part 320 guides the air of the upper passageway 103 to the other one of the right and left sides, which are the width direction of the vehicle.

Figure 12:
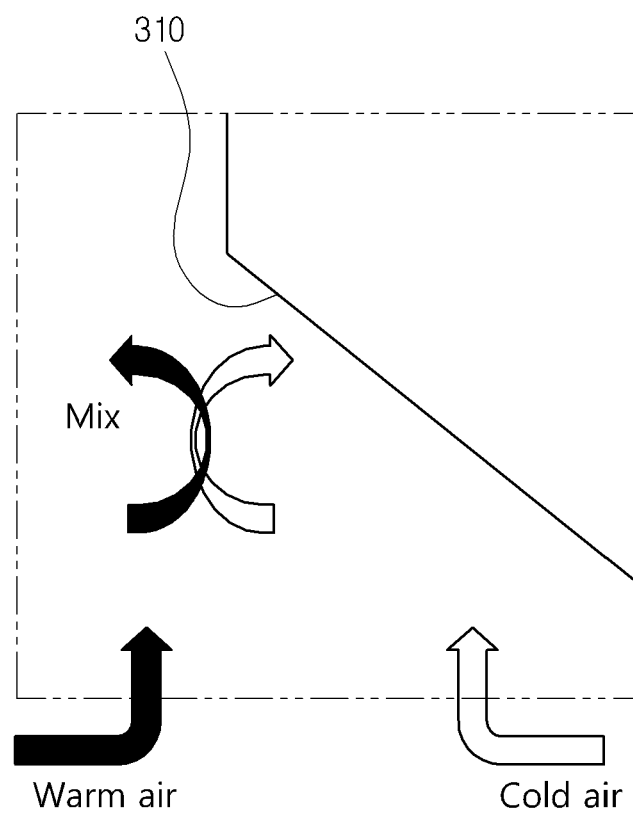
FIG. 12 is a view showing a mixing zone of a lower passageway of the air conditioner for a vehicle according to the preferred embodiment of the present invention.
Figure 13:
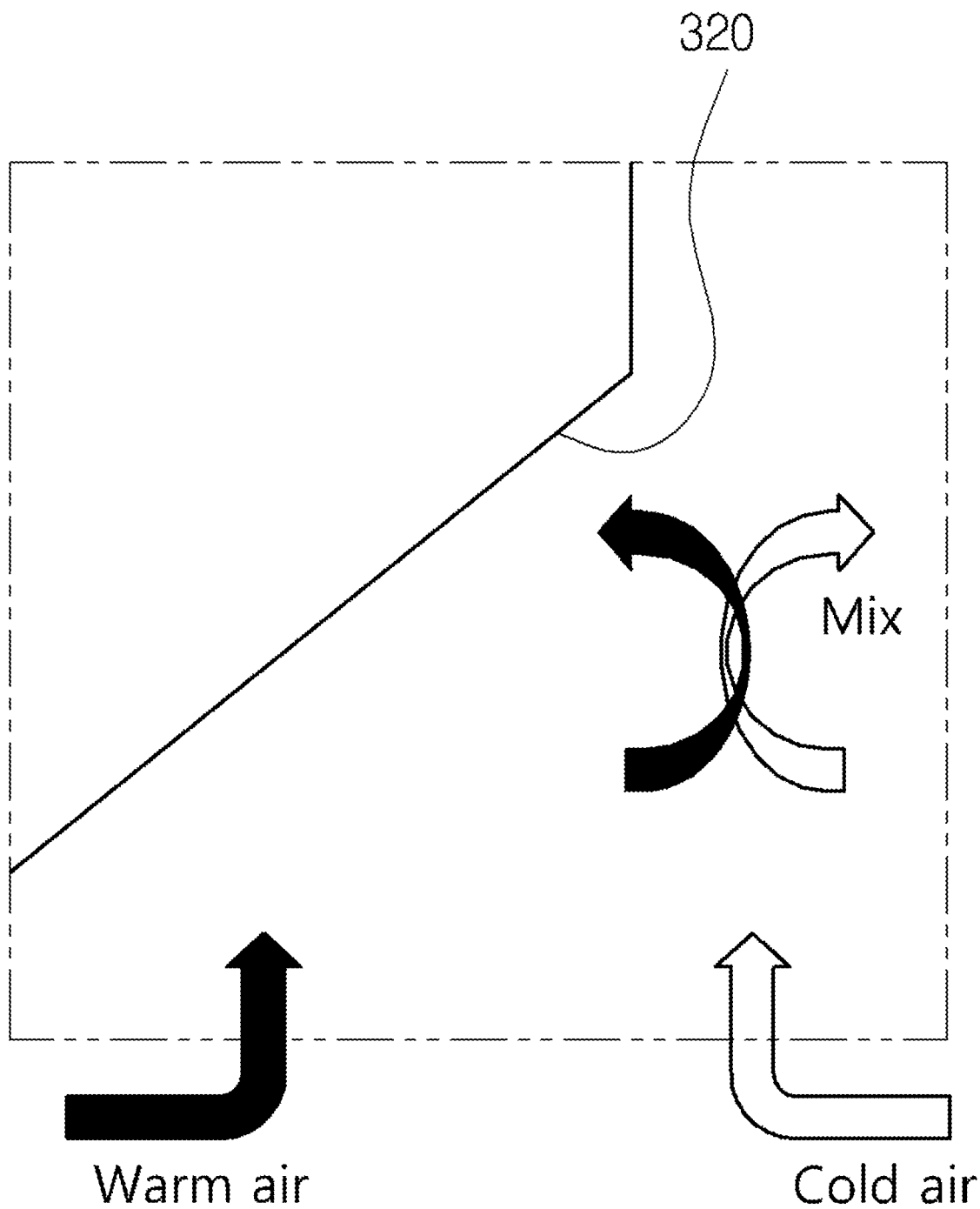
FIG. 13 is a view showing a mixing zone of an upper passageway of the air conditioner for a vehicle according to the preferred embodiment of the present invention.

Referring to FIGS. 12 and 13, the flow path of the air flowing in the upper passageway 103 and the flow path of the air flowing in the lower passageway 104 by the first inclined part 310 and the second inclined part 320 get gradually narrower in the upward direction. Through the above structure, the air conditioner can increase a flow rate of the cold air or the warm air flowing in the flow path getting gradually narrower, and effectively enhance mixability of the warm air and the cold air in the narrow space.

The twist structure of the separator can be realized in such a way that the first inclined part 310 and the second inclined part 320 are formed to be inclined in the width direction of the vehicle and in the back-and-forth direction of the vehicle. Through the twist structure of the separator 300, the cold air and the warm air flowing in the upper passageway 103 are mixed together in a first mixing zone, and the cold air and the warm air flowing in the lower passageway 104 are mixed together in a second mixing zone, and the mixed air of the first mixing zone and the mixed air of the second mixing zone are respectively guided to the right and left sides of the vehicle, and then, are discharged to the interior of the vehicle.

That is, the air flowing in the first air passageway 101 and the second air passageway 102 of the upper passageway 103 is guided to be discharged to one among the driver's seat and the passenger's seat, and the air flowing in the first air passageway 101 and the second air passageway 102 of the lower passageway 104 is guided to be discharged to the other one among the driver's seat and the passenger's seat.

Figure 14:
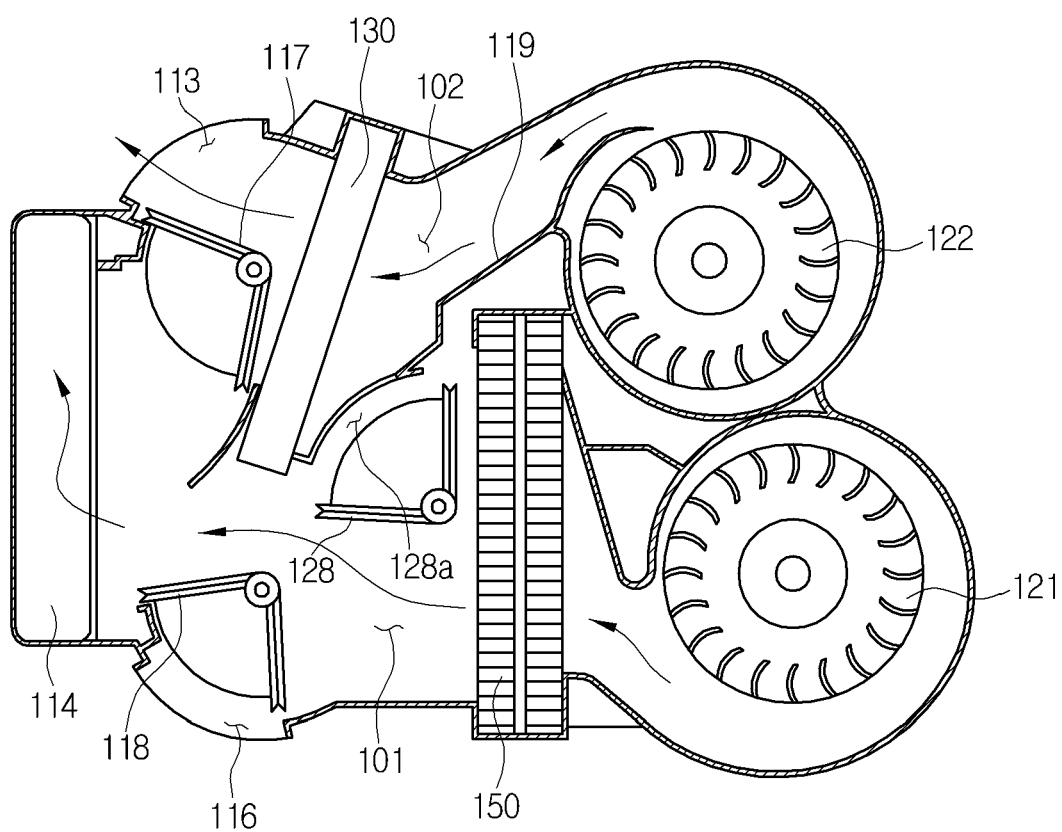
FIG. 14 is a view showing a cooling mode of the air conditioner for a vehicle according to the preferred embodiment of the present invention.
Figure 15:
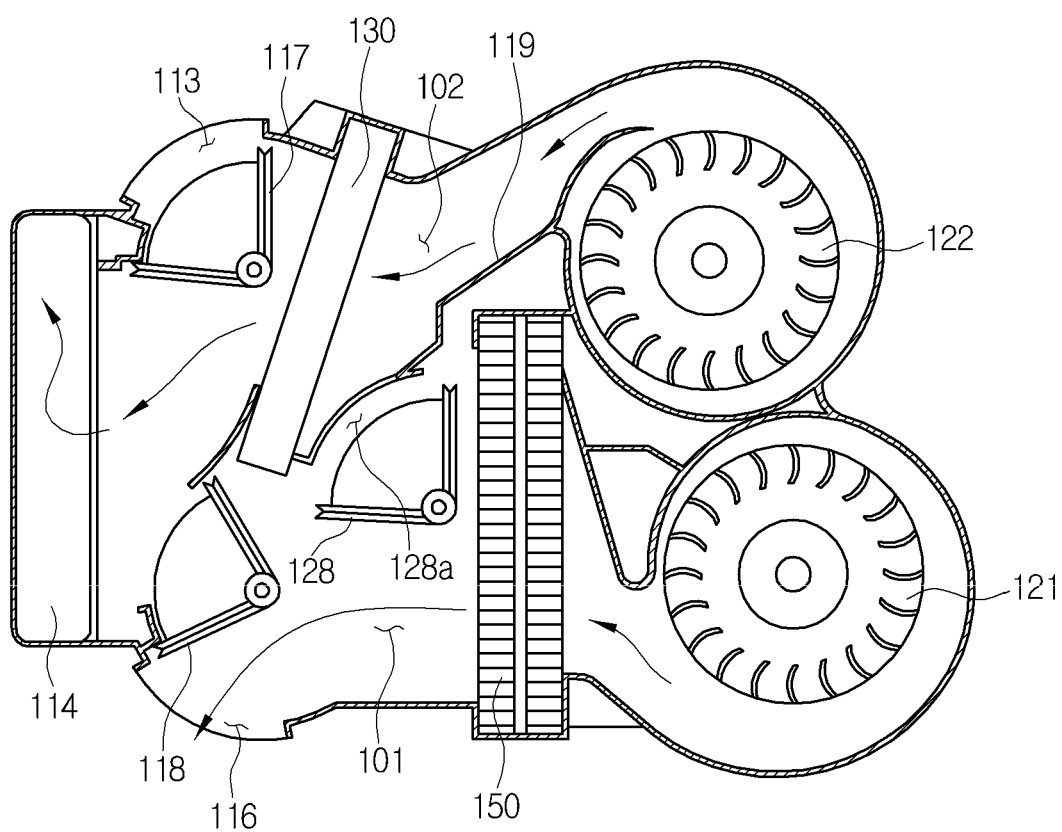
FIG. 15 is a view showing a heating mode of the air conditioner for a vehicle according to the preferred embodiment of the present invention.
Figure 16:
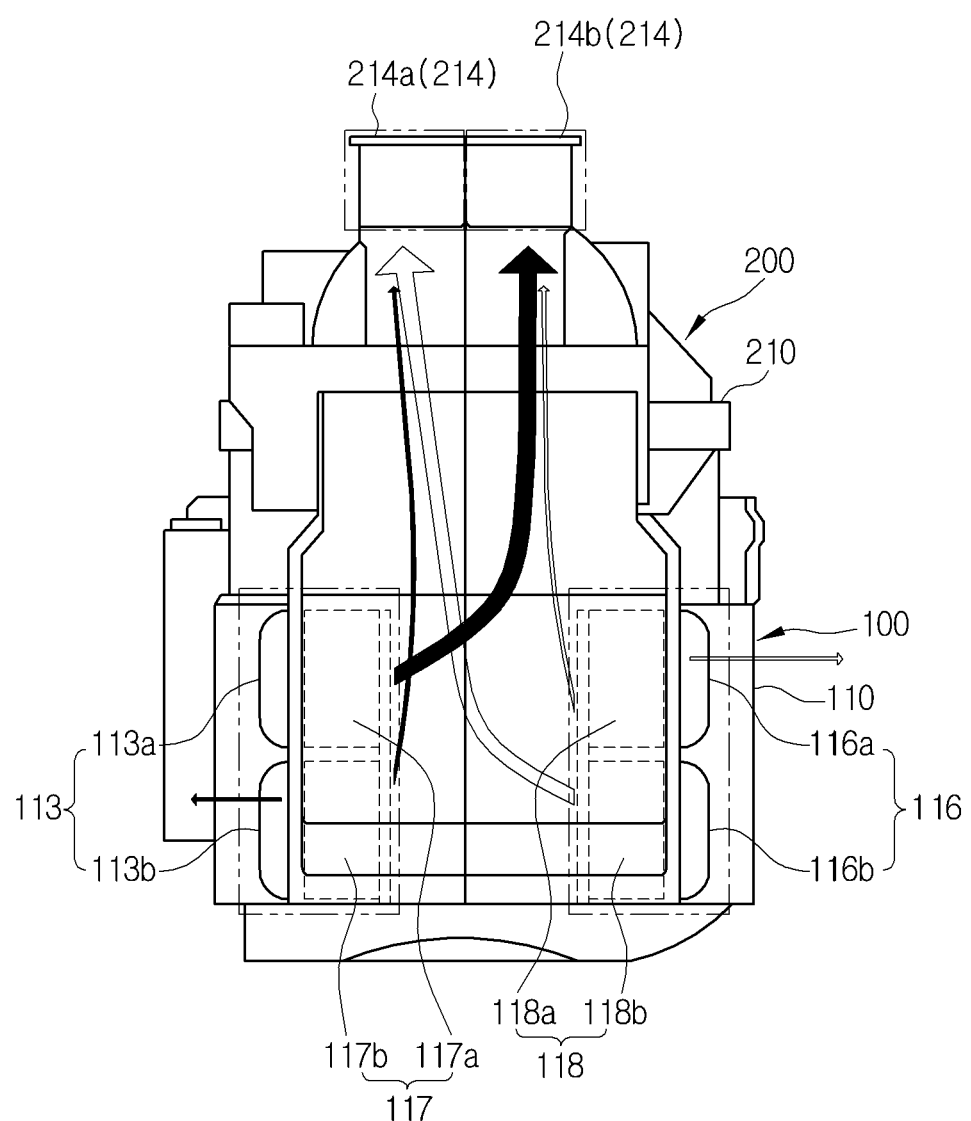
FIGS. 16 and 17 are views showing a used example of right and left independent air-conditioning of the air conditioner for a vehicle according to the preferred embodiment of the present invention.
Figure 17:
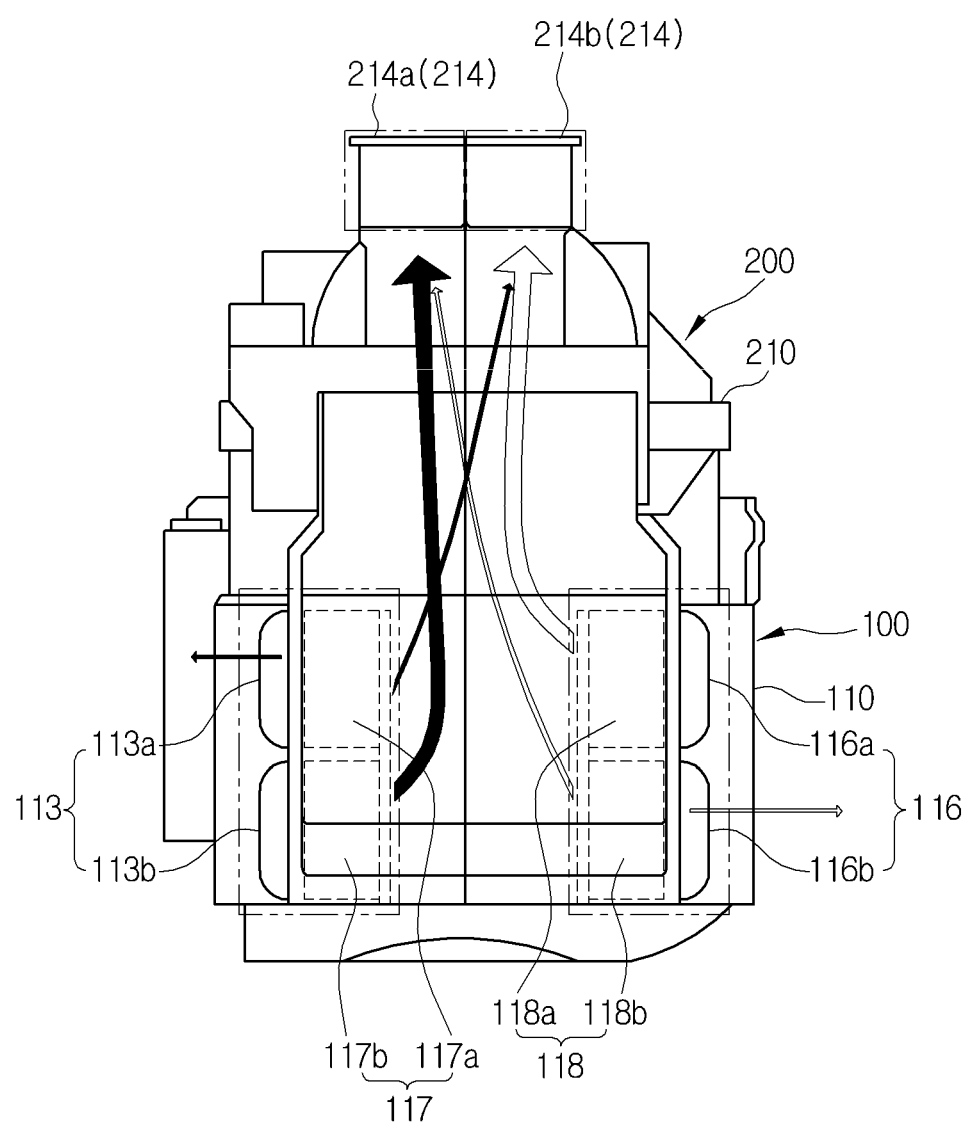

FIG. 14 is a view showing a cooling mode of the air conditioner for a vehicle according to the preferred embodiment of the present invention, FIG. 15 is a view showing a heating mode of the air conditioner for a vehicle according to the preferred embodiment of the present invention, and FIGS. 16 and 17 are views showing a used example of right and left independent air-conditioning of the air conditioner for a vehicle according to the preferred embodiment of the present invention.

Referring to FIG. 14, in the cooling mode, the indoor air is introduced into the first air passageway 101, exchanges heat with the evaporator 150, and then, is cooled. The cold air mode door 118 is rotated to close the cold air discharge hole 116 and open the flow path toward the communication passageway 114. The cooled air passes through the communication passageway 114, and is circulated to the interior of the vehicle through the air outflow holes 214 of the mixing-duct module 200. In this instance, the cold air mode door 118 is controlled in such a way that the upper cold air mode door 118a and the lower cold air mode door 118b respectively close the upper cold air discharge hole 116a and the lower cold air discharge hole 116b, and the cooled airs pass the upper passageway 103 and the lower passageway 104, are moved through the first communication passageway 301 and the second communication passageway 302, and then, are respectively supplied to the right side and the left side of the interior of the vehicle.

At the same time, the outdoor air is introduced into the second air passageway 102, exchanges heat with the condenser 130, and then, is heated. The warm air mode door 117 is rotated to close the communication passageway 114 and open the warm air discharge hole 113. The heated air is discharged to the outside through the warm air discharge hole 113. In this instance, the warm air mode door 117 is controlled in such a way that the upper warm air mode door 117a and the lower warm air mode door 117b respectively open the upper warm air discharge hole 113a and the lower warm air discharge hole 113b, and the heated airs are respectively discharged to the outside the interior through the upper warm air discharge hole 113a and the lower warm air discharge hole 113b.

Referring to FIG. 15, in the heating mode, the indoor air is introduced into the second air passageway 102, exchanges heat with the condenser 130, and then, is heated. The warm air mode door 117 is rotated to close the warm air discharge hole 113 and open the communication passageway 114. The heated air passes through the communication passageway 114, and is circulated into the interior of the vehicle through the air outflow holes 214 of the mixing-duct module 200. In this instance, the warm air mode door 117 is controlled in such a way that the upper warm air mode door 117a and the lower warm air mode door 117b respectively close the upper warm air discharge hole 113a and the lower warm air discharge hole 113b, and the heated airs respectively pass the upper passageway 103 and the lower passageway 104 and are moved through the first communication passageway 301 and the second communication passageway 302 so that warm air is supplied to the right side and the left side of the interior of the vehicle.

At the same time, the outdoor air is introduced into the first air passageway 101, exchanges heat with the evaporator 150, and then, is cooled. The cold air mode door 118 is rotated to close the communication passageway 114 and open the cold air discharge hole 116. The cooled air is discharged to the outside the interior through the cold air discharge hole 116. In this instance, the cold air mode door 118 is controlled in such a way that the upper cold air mode door 118a and the lower cold air mode door 118b respectively open the upper cold air discharge hole 116a and the lower cold air discharge hole 116b, and the cooled airs are respectively discharged to the outside the interior through the upper cold air discharge hole 116a and the lower cold air discharge hole 116b.

Referring to FIG. 16, the air introduced into the first air passageway 101 exchanges heat with the evaporator 150, and then, the air of the upper passageway 103 of the first air passageway 101 is discharged to the outside through the upper cold air discharge hole 116a, and the air of the lower passageway 104 moves upwardly through the first communication passageway 301 and is guided by the first inclined part 310 of the separator 300 so as to be supplied to the interior of the vehicle through an air outflow hole 214a of the left side. At the same time, the air introduced into the second air passageway 102 exchanges heat with the condenser 130, and then, the air of the upper passageway 103 of the second air passageway 102 moves upwardly through the second communication passageway 302 and is guided by the second inclined part 320 of the separator 300 so as to be supplied to the interior of the vehicle through an air outflow hole 214b of the right side, and the air of the lower passageway 104 is discharged to the outside through the lower warm air discharge hole 113b.

In this instance, the degree of opening of the upper cold air discharge hole 116a can be adjusted by control of the upper cold air mode door 118a, some of the cold air which is not discharged through the upper cold air discharge hole 116a is mixed with the warm air flowing in the upper passageway 103 while moving upwardly through the second communication passageway 302, and then, is discharged to the interior of the vehicle. Additionally, the degree of opening of the lower warm air discharge hole 113b can be adjusted by control of the lower warm air mode door 117b, some of the warm air which is not discharged through the lower warm air discharge hole 113b is mixed with the cold air flowing in the lower passageway 104 while moving upwardly through the first communication passageway 301, and then, is discharged to the interior of the vehicle.

Referring to FIG. 17, the air introduced into the first air passageway 101 exchanges heat with the evaporator 150, and then, the air of the lower passageway 104 of the first air passageway 101 is discharged to the outside through the lower cold air discharge hole 116b, and the air of the upper passageway 103 moves upwardly through the second communication passageway 302 and is supplied to the interior of the vehicle through an air outflow hole 214b of the right side. At the same time, the air introduced into the second air passageway 102 exchanges heat with the condenser 130, and then, the air of the lower passageway 104 of the second air passageway 102 moves upwardly through the first communication passageway 301 and is supplied to the interior of the vehicle through an air outflow hole 214a of the left side, and the air of the upper passageway 103 is discharged to the outside through the upper warm air discharge hole 113a.

In this instance, the degree of opening of the lower cold air discharge hole 116b can be adjusted by control of the lower cold air mode door 118b, some of the cold air which is not discharged through the lower cold air discharge hole 116b is mixed with the warm air flowing in the lower passageway 104 while moving upwardly through the first communication passageway 301, and then, is discharged to the interior of the vehicle.

Additionally, the degree of opening of the upper warm air discharge hole 113a can be adjusted by control of the upper warm air mode door 117a, some of the warm air which is not discharged through the upper warm air discharge hole 113a is mixed with the cold air flowing in the upper passageway 103 while moving upwardly through the second communication passageway 302, and then, is discharged to the interior of the vehicle.

The air conditioner for a vehicle according to the present invention can improve mixability of warm air and cold air to enhance a temperature difference between the right side and the left side, adjust an air volume and temperature at the right side and the left side as a passenger wants through manipulation of a controller or automatic control, and provide constant air-conditioning without any change in air volume of the opposite side even though one among the right side and the left side is turned off.

What is claimed:

1. An air conditioner for a vehicle comprising a first air passageway and a second air passageway, a heating heat exchanger disposed in one among the first air passageway and the second air passageway and a cooling heat exchanger disposed in the other one among the first air passageway and the second air passageway, wherein the air conditioner is divided into a zone where some of the air passing in the first air passageway and some of the air passing in the second air passageway are mixed together and a zone where the rest of the air passing in the first air passageway and the rest of the air passing in the second air passageway are mixed together, wherein the first air passageway and the second air passageway are divided into an upper passageway and a lower passageway by a separator, wherein the separator includes a first inclined part for guiding the air of the lower passageway to one among the right side and the left side which is the width direction of the vehicle, and a second inclined part for guiding the air of the upper passageway to the other one among the right side and the left side, wherein the first inclined part and the second inclined part are formed to be inclined in the width direction of the vehicle as well as in a back-and-forth direction of the vehicle, so that the cold air and the warm air flowing in the upper passageway are mixed together in a first mixing zone, and the cold air and the warm air flowing in the lower passageway are mixed together in a second mixing zone, and wherein air flows of the first air passageway and the second air passageway passing the cooling heat exchanger and the heating heat exchanger are formed in a horizontal direction.

2. The air conditioner according to claim 1, wherein the separator has a twist structure to mix cold air and warm air together.

3. The air conditioner according to claim 1, wherein a flow path of the air flowing in the upper passageway and a flow path of the air flowing in the lower passageway narrowing by the first inclined part and the second inclined part.

4. The air conditioner according to claim 2, wherein the air flowing in the upper passageway and the lower passageway of the upper passageway is guided to be discharged to one among a driver's seat and a passenger's seat, and the air flowing in the first air passageway and the second air passageway of the lower passageway is guided to be discharged to the other one among a driver's seat and a passenger's seat.

5. The air conditioner according to claim 4, wherein the cooling heat exchanger and a cold air discharge hole are disposed in the first air passageway, and the heating heat exchanger and a warm air discharge hole are disposed in the second air passageway, and wherein the air conditioner comprises: a cold air mode door for adjusting the degree of opening between a flow path heading towards the cold air discharge hole and a flow path heading towards the interior of the vehicle; and a warm air mode door for adjusting the degree of opening between a flow path heading towards the warm air discharge hole and the flow path heading towards the interior of the vehicle.

6. The air conditioner according to claim 5, an air flow heading towards the interior of the vehicle from a downstream side of the cold air mode door and the warm air mode door is formed in an upward direction.

7. The air conditioner according to claim 6, wherein the first air passageway and the second air passageway are formed in such a way that the cold air and the warm air are mixed together during an air flow process that air flows upwardly from the downstream side of the cold air mode door and the warm air mode door.

8. The air conditioner according to claim 7, wherein the upper passageway and the lower passageway are divided in a back-and-forth direction of the vehicle by the separator at the downstream side of the cold air mode door and the warm air mode door.

9. The air conditioner according to claim 2, wherein the first air passageway and the second air passageway are partitioned from each other in the right-and-left direction by a partition wall .

10. The air conditioner according to claim 2, wherein the cooling heat exchanger and the heating heat exchanger are vertically divided into two by the separator.

11. The air conditioner according to claim 2, comprising: an air-conditioning module in which the first air passageway and the second air passageway ; an intake module for introducing at least one among an indoor air and an outdoor air into the first air passageway and the second air passageway ; and the separator , wherein a distributor module for discharging the air passing at least one among the cooling heat exchanger and the heating heat exchanger to parts of the interior of the vehicle is formed integrally and is arranged outside on the basis of a dash panel.

12. The air conditioner according to claim 1, wherein a first blower unit is disposed in the first air passageway and a second blower unit is disposed in the second air passageway , and wherein the first blower unit and the second blower unit are arranged in parallel in a horizontal direction.

13. The air conditioner according to claim 12, wherein the air moves downwardly through an indoor air inlet or an outdoor air inlet, exchanges heat with at least one of the heating heat exchanger and the cooling heat exchanger while moving in the horizontal direction in the air-conditioning module, and then, moves upwardly toward air outflow holes so as to form an air flow of a "⊔" or "U" shape.

14. The air conditioner according to claim 13, wherein the indoor air inlet and the outdoor air inlet are arranged side by side in the back-and-forth direction of the vehicle, and the first blower unit and the second blower unit are arranged side by side in a width direction of the vehicle.

* * * * *